(12) United States Patent
Kim et al.

(10) Patent No.: US 10,683,600 B2
(45) Date of Patent: Jun. 16, 2020

(54) WASHING MACHINE

(71) Applicant: SAMSUNG ELECTRONICS CO., LTD., Suwon-si (KR)

(72) Inventors: Sung Jong Kim, Suwon-si (KR); Jeong Hoon Kang, Seoul (KR); Min Sung Kim, Yongin-si (KR); Seung Oh Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/597,652

(22) Filed: May 17, 2017

(65) Prior Publication Data

US 2017/0335502 A1  Nov. 23, 2017

(30) Foreign Application Priority Data

May 19, 2016 (KR) .......................... 10-2016-0061463

(51) Int. Cl.
| | | |
|---|---|---|
| *D06F 17/08* | (2006.01) | |
| *D06F 37/40* | (2006.01) | |
| *D06F 23/04* | (2006.01) | |
| *D06F 37/24* | (2006.01) | |
| *D06F 37/30* | (2020.01) | |
| *D06F 39/02* | (2006.01) | |
| *D06F 39/08* | (2006.01) | |

(52) U.S. Cl.
CPC .............. *D06F 37/40* (2013.01); *D06F 17/08* (2013.01); *D06F 23/04* (2013.01); *D06F 37/24* (2013.01); *D06F 37/304* (2013.01); *D06F 39/02* (2013.01); *D06F 39/083* (2013.01); *D06F 39/088* (2013.01); *D06F 2202/065* (2013.01); *D06F 2204/06* (2013.01)

(58) Field of Classification Search
CPC ...................................................... D06F 17/08
See application file for complete search history.

(56) References Cited

U.S. PATENT DOCUMENTS

| | | | | |
|---|---|---|---|---|
| 2005/0223754 A1* | 10/2005 | Choi | ...................... | D06F 37/304 68/3 R |
| 2012/0137738 A1* | 6/2012 | Lee | ......................... | D06F 21/08 68/12.24 |

FOREIGN PATENT DOCUMENTS

| | | |
|---|---|---|
| CN | 203021794 U | 6/2013 |
| CN | 105019192 A | 11/2015 |
| KR | 10-2012-0102627 | 2/2012 |

* cited by examiner

*Primary Examiner* — Jason Y Ko
(74) *Attorney, Agent, or Firm* — Staas & Halsey LLP

(57) ABSTRACT

Disclosed herein is a washing machine having a driving motor for generating a rotational force, a clutch for selectively transmitting the rotational force to the spin basket and the pulsator, a sensor and a position indicating member for detecting the rotational speed of the spin basket.

11 Claims, 8 Drawing Sheets

WASHING MACHINE

CROSS-REFERENCE TO RELATED APPLICATIONS

This application claims the benefit of Korean Patent Application No. 10-2016-0061463, filed on May 19, 2016 in the Korean Intellectual Property Office, the disclosure of which is incorporated herein by reference.

BACKGROUND

1. Field

Embodiments of the present disclosure relate to a washing machine having a structure to detect the rotating speed of a spin basket during the spin-drying cycle.

2. Description of the Related Art

Generally, a washing machine is an apparatus for washing clothes using frictional force between laundry and water, and may be classified into a front-loading type washing machine and a top-loading type washing machine.

The front-loading type washing machine washes laundry using falling of laundry while a spin basket in which laundry received is rotating. The top-loading type washing machine has a pulsator provided at the bottom of a spin basket in which laundry received and washes laundry using a current of water generated by the pulsator.

Both of the front-loading type washing machine and the top-loading type washing machine remove the water of laundry using a centrifugal force by the rotation of the spin basket.

The washing machine operates by using the rotation of the spin basket or the pulsator, and the washing machine widely uses a motor as a device for providing rotational force to the spin basket or the pulsator.

The motor commonly used in a washing machine may be broadly classified into a control type motor (so-called servo motor) for precisely controlling the rotation speed of the motor and an non-control type motor that does not control the rotation speed of the motor.

The control type motor includes a speed sensor for detecting the rotational speed of the motor and a current sensor for detecting the driving electric current of the motor and precisely controls the driving current according to the detected rotational speed of the motor. Such a control type motor may precisely control the rotation speed of the motor regardless of a load.

On the other hand, the non-control type motor typically controls the rotation of the motor by turning on/off the power. Such a non-control motor is relatively inexpensive.

When the washing machine includes the non-control type motor, it is difficult to precisely control the rotation speed of the motor, and there is a possibility that the resonance phenomenon continuously occurs during the spin-drying cycle. The resonance phenomenon is a phenomenon in which the spin basket is vigorously vibrated because the resonant frequency of the spin basket coincides with the rotational frequency of the motor when the spin-drying cycle is performed.

The washing machine using the non-control type motor controls the rotation of the spin basket only through the ON time and the OFF time of the motor without considering the rotating speed of the spin basket, and thus it is difficult for the rotating speed of the spin basket to avoid resonant speed of the spin basket.

SUMMARY

Therefore, it is an aspect of the present disclosure to provide a washing machine having a non-control type motor, which detects the rotating speed of a spin basket and minimizes a resonance phenomenon during a spin-drying cycle.

It is another aspect of the present disclosure to provide a washing machine having an improved structure of a sensor and a position indicating member for detecting a rotating speed of a spin basket.

Additional aspects of the disclosure will be set forth in part in the description which follows and, in part, will be obvious from the description, or may be learned by practice of the disclosure.

In accordance with an aspect of the present disclosure, there is provided a washing machine including: a spin-drying shaft connected to a spin basket; a clutch configured to transmit rotational force to the spin-drying shaft; a position indicating member disposed inside a clutch housing and rotating together with the spin-drying shaft; and a sensor disposed outside the clutch housing and configured to detect the position indicating member.

The clutch housing may include an opening to expose the position indicating member to the outside of the clutch housing in accordance with rotation of the spin-drying shaft. The sensor may detect the position indicating member exposed through the opening.

The sensor may be mounted to the outside of the clutch housing by a mounting member.

The washing machine may further includes a balancer rotating together with the position indicating member to align the center of gravity of the position indicating member with the center axis of the spin-drying shaft.

The clutch may include a drum accommodated in the clutch housing and connected to the spin-drying shaft to rotate together with the spin-drying shaft. The position indicating member may be disposed on the side surface of the drum.

The opening may be provided in the side surface of the clutch housing. The sensor may be mounted on the outer surface of the clutch housing.

The position indicating member may be mounted on the outer surface of the drum by a mounting member.

The mounting member may include a balancer to align the center of gravity of the position indicating member with the rotation axis of the spin-drying shaft.

The drum may include a neck connected to the spin-drying shaft. The mounting member may include a body supported on the upper surface of the drum and a plurality of extensions extended from the body to the side surface of the drum, wherein the body provided with a hole through which the neck of the drum passes.

The plurality of extensions may be space apart from each other along the circumferential direction of the drum. The position indicating member may be installed in at least one of the plurality of extensions. The rest of the plurality of extensions not provided with the position indicating member may be a balancer configured to balance with the position indicating member.

The washing machine may further include: a brake belt configured to stop rotation of the spin-drying shaft inside the clutch housing; and a brake lever disposed outside the clutch housing to control the brake belt. The brake belt may be connected to the brake lever through the opening.

The position indicating member may include a magnet. The sensor may include a hall sensor.

In accordance with an aspect of the present disclosure, there is provided a washing machine including: a spin-drying shaft connected to a spin basket; a clutch configured to transmit rotational force to the spin-drying shaft; a brake configured to stop rotation of the spin-drying shaft; and a sensor configured to detect the rotating speed of the spin-drying shaft. The clutch may include a clutch housing provide with an opening for operation of the brake. The sensor may detect the rotating speed of the spin-drying shaft through the opening.

The brake may include a brake belt configured to stop rotation of the spin-drying shaft inside the clutch housing and a brake lever disposed outside the clutch housing to control the brake belt. The opening may be provided for connection of the brake belt and the brake lever. The sensor may be mounted to a side of the opening by a mounting member.

The clutch may include a drum connected to the spin-drying shaft to rotate together with the spin-drying shaft within the clutch housing. The sensor may be mounted on the outer surface of the clutch housing and detects the rotating speed of the drum through the opening.

The washing machine may further include a position indicating member disposed on the side surface of the drum to rotate together with the drum. The sensor may sense the position indicating member so as to detect the rotating speed of the drum.

The washing machine may further include at least one balancer disposed on the side surface of the drum to align the center of gravity of the position indicating member with the rotation axis of the spin-drying shaft.

The position indicating member and the at least one balancer may be disposed on the side surface of the dram by a mounting member.

In accordance with an aspect of the present disclosure, there is provided a washing machine including: a clutch housing; a shaft assembly accommodated in the clutch housing and configured to transmit rotational force to a spin basket; and a sensor configured to detect the rotating speed of the shaft assembly through an opening provided at the clutch housing.

The washing machine may further include a position indicating member provided at the shaft assembly. The sensor may sense the position indicating member through the opening disposed at the clutch housing so as to detect the rotating speed of the shaft assembly.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Reference will now be made in detail to the embodiments, examples of which are illustrated in the accompanying drawings, wherein like reference numerals refer to the like elements throughout. The embodiments are described below by referring to the figures.

Configurations illustrated in the embodiments and the drawings described in the present specification are only the preferred embodiments of the present disclosure, and thus it is to be understood that various modified examples, which may replace the embodiments and the drawings described in the present specification, are possible when filing the present application.

Also, like reference numerals or symbols used in the drawings of the present specification represent members or components performing the substantially same functions.

Also, the terms used in the present specification are used to describe the embodiments of the present disclosure. Accordingly, it should be apparent to those skilled in the art that the following description of exemplary embodiments is provided for illustration purpose only and not for the purpose of limiting the embodiments as defined by the appended claims and their equivalents. It is to be understood that the singular forms "a," "an," and "the" include plural referents unless the context clearly dictates otherwise. In this specification, it will be understood that when the terms "includes," "comprises," "including," and/or "comprising," when used in this specification, specify the presence of stated features, figures, steps, components, or combination thereof, but do not preclude the presence or addition of one or more other features, figures, steps, components, members, or combinations thereof.

It will be understood that, although the terms first, second, etc. may be used herein to describe various components, these components should not be limited by these terms. These terms are only used to distinguish one component from another. For example, a first component could be termed a second component, and, similarly, a second component could be termed a first component, without departing from the scope of the present disclosure. As used herein, the term "and/or" includes any and all combinations of one or more of associated listed items.

Hereinafter, the embodiments of the present disclosure will be described in detail with reference to the accompanying drawings.

Figure 1:
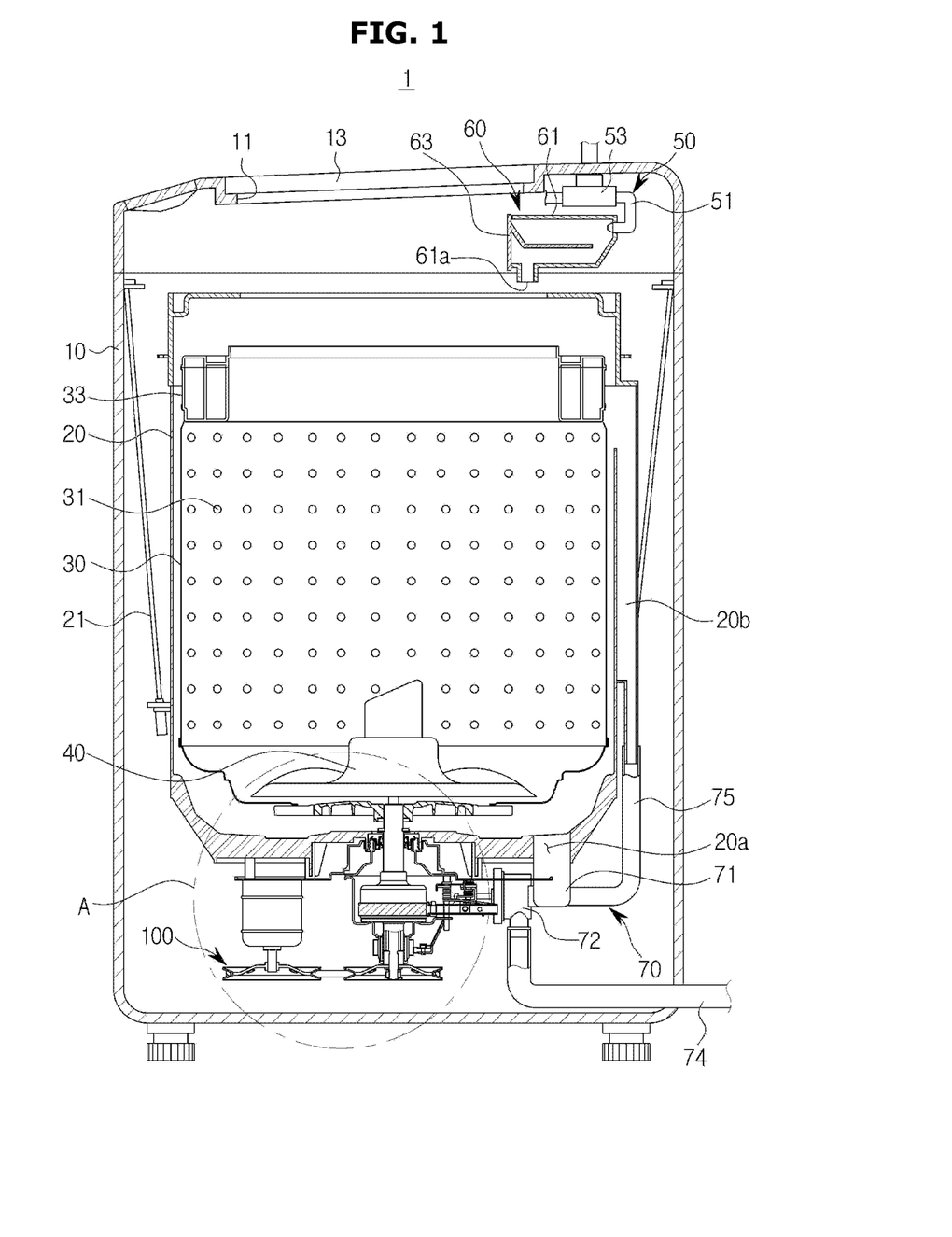
FIG. 1 is a cross-sectional view illustrating a washing machine according to an embodiment of the present disclosure.
Figure 2:
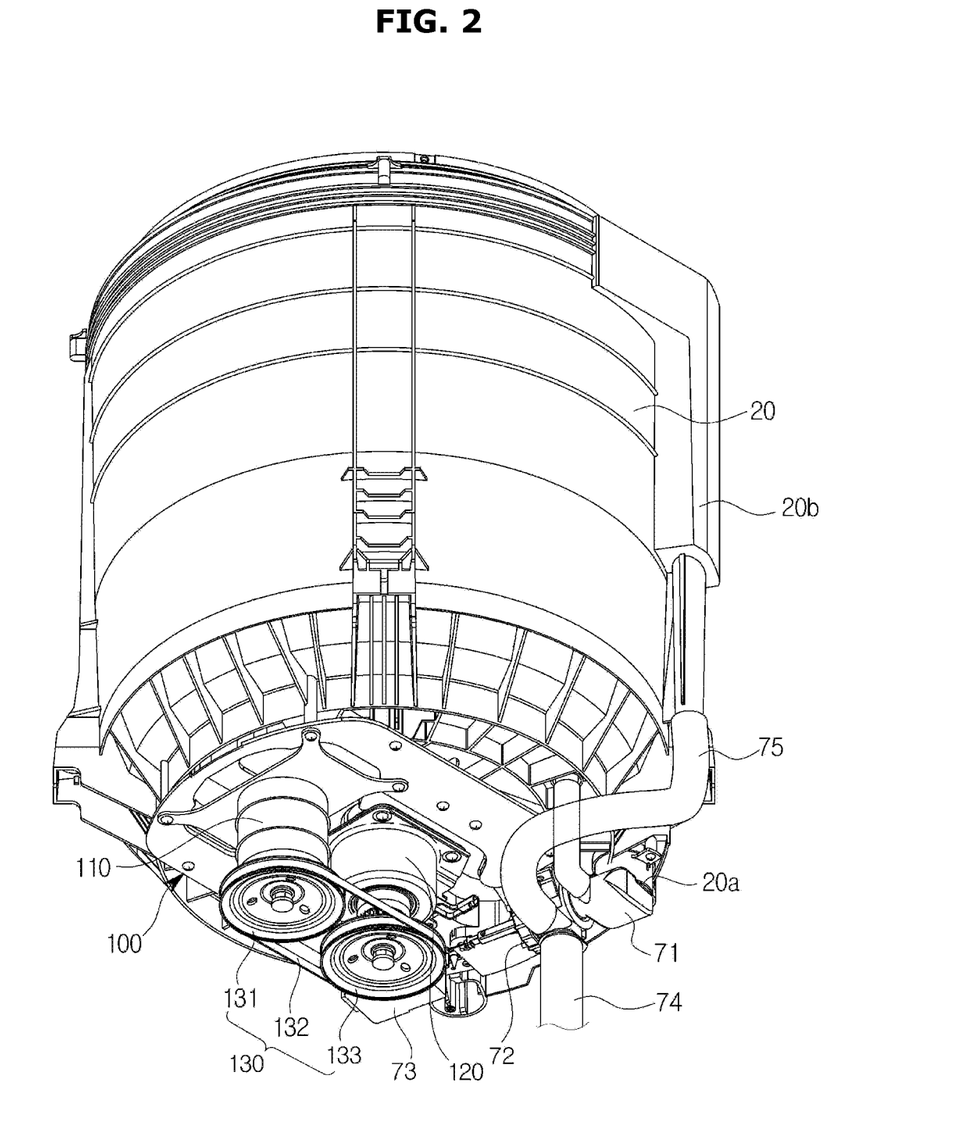
FIG. 2 is a perspective view illustrating the bottom surface of a washing machine according to an embodiment of the present disclosure.

FIG. 1 is a cross-sectional view illustrating a washing machine according to an embodiment of the present disclosure, and FIG. 2 is a perspective view illustrating the bottom surface of a washing machine according to an embodiment of the present disclosure.

Referring to FIGS. 1 and 2, the washing machine 1 includes a cabinet 10 for forming an outer appearance, a water tub 20 for containing water, a spin basket 30 rotatably arranged in the water tub 20, a pulsator 40 for generating a current of water within the spin basket 30, a water supplier 50 for supplying water to the water tub 20, a detergent supplier 60 for supplying detergent to the spin basket 30, and a rotation driving unit 100 for selectively driving to rotate the spin basket 30 and the pulsator 40.

An inlet 11 is arranged in the upper portion of the cabinet 10 to allow laundry to be introduced into the spin basket 30. The inlet 11 is opened or closed by a door 13 provided at the upper portion of the cabinet 10.

The water tub 20 may have a cylindrical shape with an open upper part for inputting laundry.

A drainage port 20a for discharging the water contained in the water tub 20 is provided on the bottom surface of the water tub 20 and an overflow pipe 20b for draining the water accommodated above a predetermined water level is provided on the side surface of the water tub 20.

The water tub 20 is supported by a suspension device 21 in a state of being hung in the cabinet 10. The suspension device 21 attenuates a vibration generated by the water tub 20 during rotation of the spin basket 30 or the pulsator 40, and is disposed between the outer surface of the water tub 20 and the inner surface of the cabinet 10.

The spin basket 30 may have a cylindrical shape with an open upper part for inputting laundry, and is rotatably disposed in the water tub 20.

The spin basket 30 accommodates laundry and water therein, and has a plurality of water holes 31 formed in the side surface of the spin basket 30 so that the inner space of the spin basket 30 and the inner space of the water tub 20 are connected to each other.

A balancer 33 for offsetting an unbalanced load occurring in the spin basket 30 at the time of rotating the spin basket 30 is mounted on the upper portion of the spin basket 30 so that the spin basket 30 may be stably rotated.

The pulsator 40 may be provided inside the bottom surface of the spin basket 30 and rotate in a forward or reverse direction to generate water flow. The laundry in the spin basket 30 is stirred together with the water by the current of water generated by the pulsator 40 and the laundry is washed by the friction between the laundry and the water.

The water supplier 50 is provided on the upper part of the water tub 20 and supplies water into the water tub 20 from an external water source (not shown).

The water supplier 50 includes a water supply pipe 51 for guiding water from an external water source (not shown) to the water tub 20 and a water supply valve 53 provided on the water supply pipe 51 to open and close the water supply pipe 51.

One end of the water supply pipe 51 is connected to the detergent supplier 60, so that the water guided by the water supply pipe 51 is supplied to the water tub 20 via the detergent supplier 60.

The detergent supplier 60 includes a detergent box 63 for receiving the detergent, and a detergent box case 61 for accommodating the detergent case 63.

The detergent box case 61 is fixed to the cabinet 10 and is connected to one end of the water supply pipe 51. A discharge port 61a for discharging the water via the detergent supplier 60 to the water tub 20 is provided on the bottom surface of the detergent box case 61.

The detergent box 63 is provided corresponding to the water supply pipe 51 so that the water supplied through the water supply pipe 51 is mixed with the detergent contained in the detergent box 63.

The detergent box 63 is detachably mounted to the detergent box case 61. The user may eject the detergent box 63 from the detergent box case 61 and put detergent into the detergent box 63.

The water supplied by the water supplier 50 is mixed with the detergent contained in the detergent box 63 while passing through the detergent box 63, and the water mixed with the detergent is supplied to the water tub 20 through the discharge port 61a provided on the bottom surface of the water tub 20.

A drainage unit 70 may be provided below the water tub 20 to discharge the water contained in the water tub 20 to the outside of the cabinet 10.

The drainage unit 70 includes a first drain pipe 71 for guiding the water contained in the water tub 20 to the outside of the water tub 20, a drain valve 72 for opening or closing the first drain pipe 71, a drain motor 73 for driving the drain valve 72, a drain hose 74 for guiding the water that has passed through the drain valve 72 to the outside of the cabinet 10, and a second drain pipe 75 for guiding the water that overflowed above a certain level to a drain hose.

One end of the first drain pipe 71 is connected to the drainage port 20a provided on the bottom surface of the water tub 20 and the other end thereof is connected to the drain valve 72.

The drain valve 72 may be provided at one end of the first drain pipe 71 and may receive the driving force from the drain motor 73 through a link wire.

The drain motor 73 drives the opening and closing of the drain valve 72 through the link wire. For example, when the drain motor 73 pulls the link wire, the drain valve 72 may be opened and water is drained, and when the drain motor 73 releases the link wire, the drain valve 73 may be closed.

One end of the drain hose 74 is connected to the drain valve 72 and the other end is extended to the outside of the cabinet 10.

The second drain pipe 75 connects the overflow pipe 20b, which is provided on the side surface of the water tub 20, and the drain hose 74.

The rotation driving unit 100 is provided at the lower side of the water tub 20 and selectively provides a rotational force to the spin basket 30 and the pulsator 40. Specifically, the rotation driving unit 100 provides a forward or reverse rotational force to the pulsator 40 in the washing cycle and rinsing cycle, and provides a reverse rotational force to the spin basket 30 and the pulsator 40 in the spin drying cycle.

The rotation driving unit 100 will be described in detail below.

Figure 3:
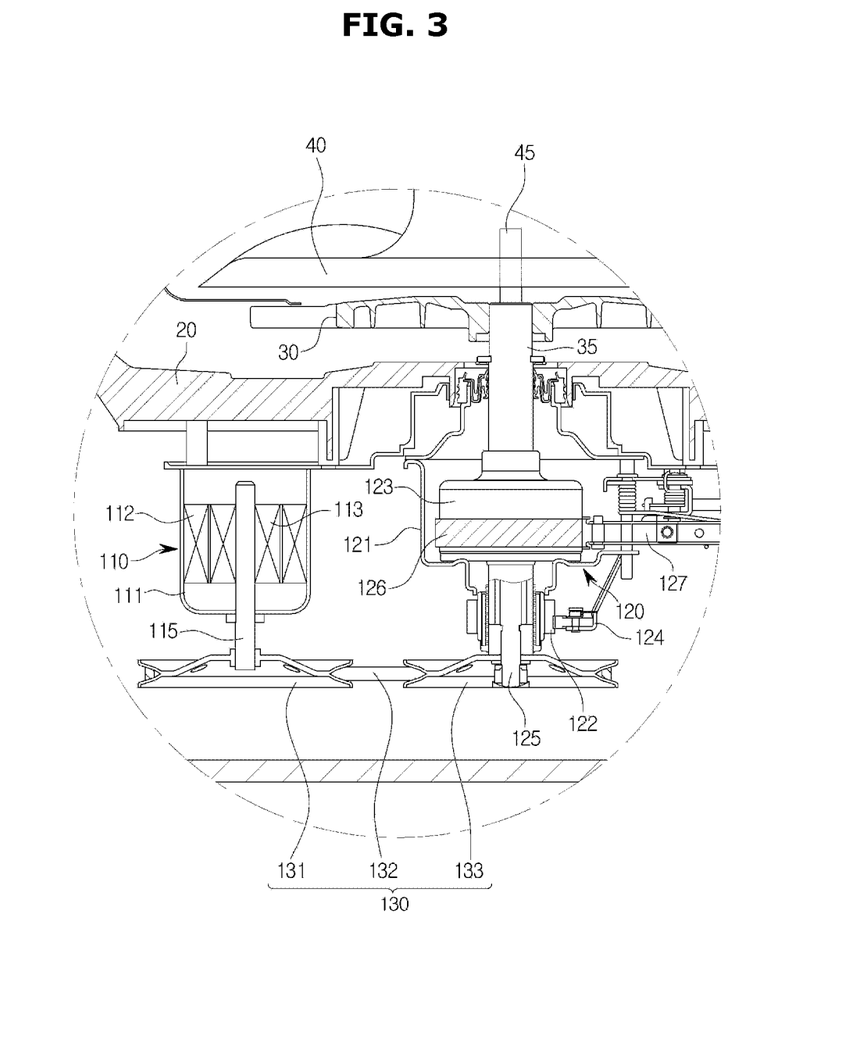
FIG. 3 is an enlarged view illustrating the region A of the FIG. 1.
Figure 4:
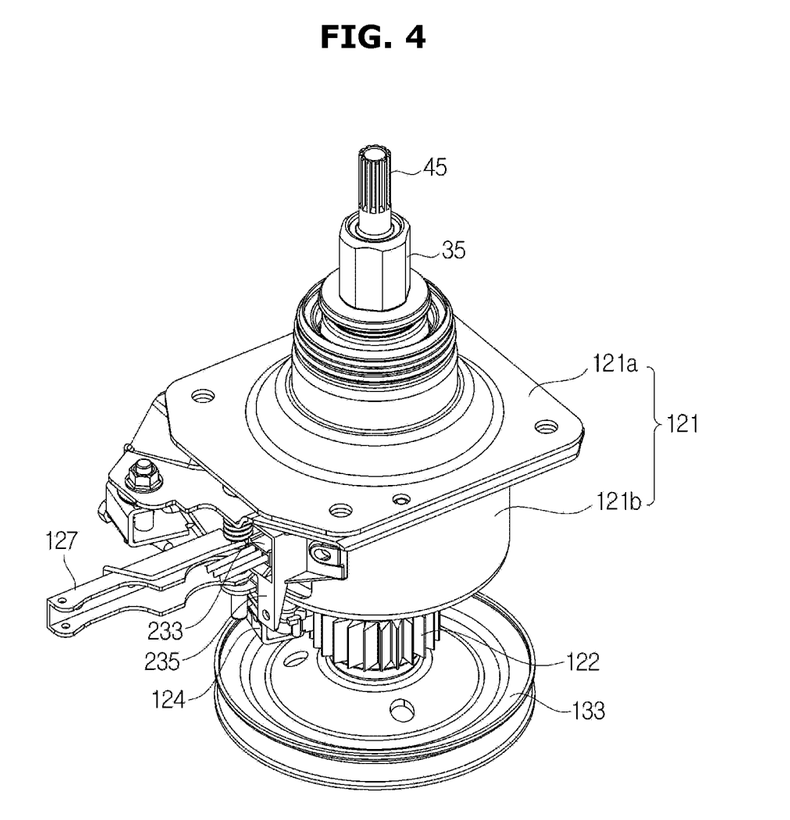
FIG. 4 is a perspective view illustrating a clutch of a washing machine according to an embodiment of the present disclosure.
Figure 5:
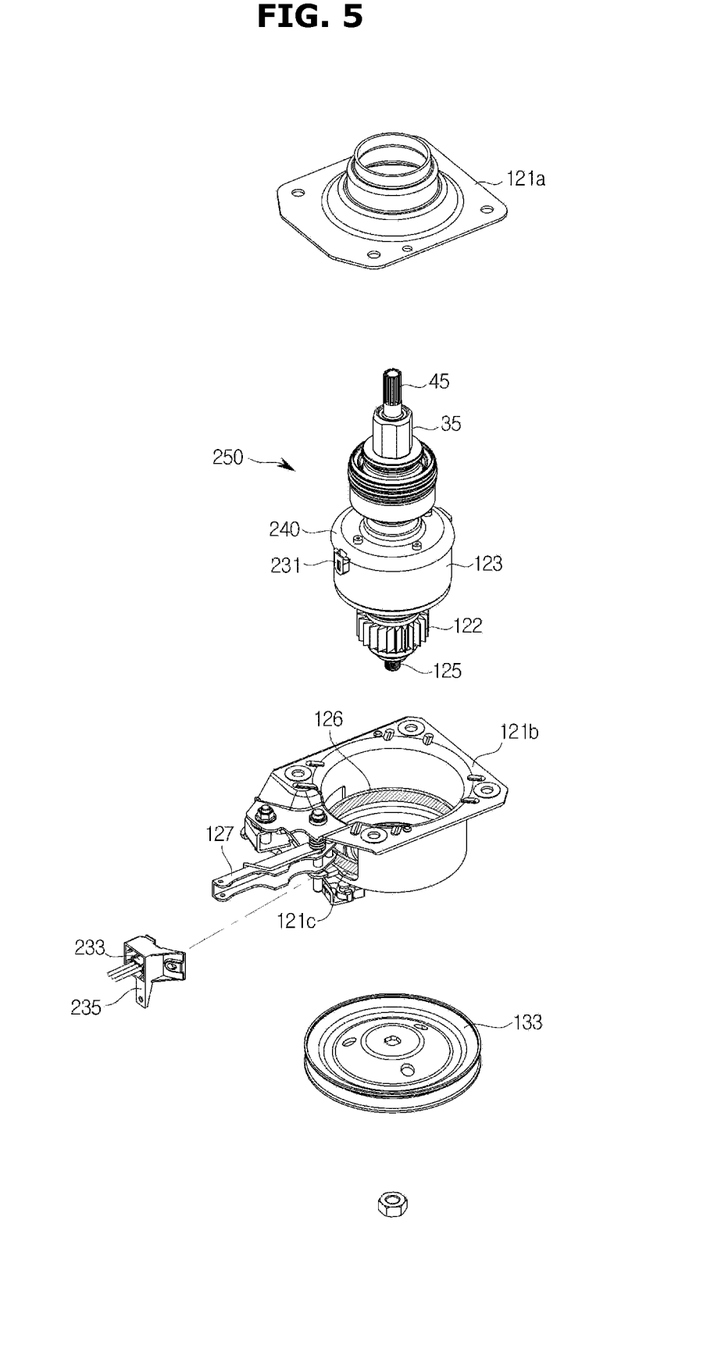
FIG. 5 is an exploded perspective view illustrating a part of the clutch of a washing machine according to the embodiment of the present disclosure.

FIG. 3 is an enlarged view illustrating the region A of the FIG. 1, FIG. 4 is a perspective view illustrating a clutch of a washing machine according to an embodiment of the present disclosure, and FIG. 5 is an exploded perspective view illustrating a part of the clutch of a washing machine according to the embodiment of the present disclosure.

Referring to FIGS. 3 to 5, the rotation driving unit 100 includes a driving motor 110 for generating a rotational force, a clutch 120 for selectively transmitting the rotational force of the driving motor 110 to the spin basket 30 and the pulsator 40, and a pulley unit 130 for transmitting the rotational force generated by the driving motor 110 to the clutch 120.

The driving motor 110 includes a motor casing 111 that forms an appearance of the driving motor 110, a stator 112 that generates a rotating magnetic field, and a rotor 113 that rotates by the rotating magnetic field. The driving motor 110 generates a rotational force for rotating the spin basket 30 and pulsator 40.

The stator 112 is fixed inside the motor casing 111 and may have a hollow cylindrical shape. Further, the stator 112 includes a coil (not shown) that generates a rotating magnetic field when electric current is conducted, and is disposed along the inner circumferential surface of the stator 112.

The rotor 113 is rotatably provided in the hollow of the stator 112 and rotates by interaction with the rotating magnetic field generated by the stator 112.

An induced current is generated in the rotor 113 by the rotating magnetic field generated by the stator 112. By the interaction between the magnetic field due to the induced current and the rotating magnetic field generated by the stator 112, the rotor 113 rotates. A motor that generates the rotational force through the interaction between the magnetic field generated in the rotor 113 by an induction current and the magnetic field generated by the stator 112 is usually called an induction motor (IM).

However, the driving motor 110 included in the washing machine 1 is not limited to the induction motor. For example, the washing machine 1 may employ a synchronous motor (SM) in which the rotor 113 includes a permanent magnet generating a magnetic field.

Hereinafter, it is assumed that the washing machine 100 according to an exemplary embodiment employs an induction motor as the driving motor 110.

The washing machine 1 does not include a separate speed control circuit for controlling the rotational speed of the driving motor 110. In other words, the washing machine 1 only includes a driving switch for supplying external power directly to the driving motor 110 and for turning the driving motor 110 on or off.

Specifically, when the driving switch is turned on, power is supplied to the driving motor 110 to drive the driving motor 110. When the driving switch 51 is turned off, the power supply is interrupted and the driving motor 110 stops. In other words, the washing machine 1 may only control the driving and stopping of the driving motor 110, and does not precisely control the rotational speed of the driving motor 110.

A motor rotating shaft 115 is coupled with the rotor 113 to rotate together with the rotor 113 and transmits the rotational force of the rotor 113 to the pulley unit 130.

The clutch 120 includes a clutch housing 121, a shaft assembly 250, a clutch lever 124 and a brake. The clutch 120 transmits a rotational force transmitted from the pulley unit 130 to the pulsator 40 and the spin basket 30 selectively.

The clutch housing 121 forms an outer appearance of the clutch unit 120 and includes an upper housing 121a and a lower housing 121b.

The shaft assembly 250 includes a washing shaft 45 connected to the pulsator 40, a spin-drying shaft 35 connected to the spin basket 30, a drum 123 connected to the spin-drying shaft 35 and containing a reduction gear connected to the washing shaft 45 therein, a switching gear 122, and a clutch rotation shaft 125. The shaft assembly 250 has a double shaft structure that the washing shaft 45 and the reduction gear connected thereto are enclosed by the spin-drying shaft 35 and the drum 123 connected thereto, so that the washing shaft 45 may rotate independently within the spin-drying shaft 35.

The brake includes a brake belt 126 and a brake lever 127. The clutch lever 124 and the brake lever 127 are mounted on the clutch housing 121 and the brake belt 126 is provided to surround the shaft assembly 250 within the clutch housing 121.

The brake lever 127 and the clutch lever 124 may be mounted on the lower housing 121b of the clutch housing 121, and the brake belt is provided to surround the drum 123 in the clutch housing 121. The clutch housing 121 is provided with an opening 121c so that the brake lever 127 and the brake belt 126 may be connected to each other.

The clutch rotation shaft 125 receives the rotational force of the driving motor 110 from the pulley unit 130 to be described later and transmits the received rotational force to the switching gear 122.

The switching gear 122 selectively transmits the rotational force of the clutch rotating shaft 125 to the spin-drying shaft 35 which connected to the spin basket 30 and the washing shaft 45 which connected to the pulsator 40 in accordance with the operation of the washing machine 1.

Specifically, the switching gear 122 transmits the rotational force of the clutch rotation shaft 125 only to the washing shaft 45 during the washing cycle and transmits the rotational force of the clutch rotation shaft 125 to both the washing shaft 45 and the spin-drying shaft 35 during the spin-drying cycle in accordance with the operation of the clutch lever 124.

The clutch lever 124 is connected to the drain motor 73 to control the switching gear 122 according to the operation of the drain motor 73 (see FIG. 2).

Specifically, when the drain motor 73 is not operated, the switching gear 122 is operated by the clutch lever 124 so that the switching gear 122 transmits the rotational force of the clutch rotation shaft 125 only to the washing shaft 45. When the drain motor 73 is operated, the clutch lever 124 operate the switching gear 122 to transmit the rotational force of the clutch rotation shaft 125 to both the washing shaft 45 and the spin-drying shaft 35.

The reduction gear housed in the drum 123 decelerates the rotation speed of the clutch rotation shaft 125 to improve the torque of the washing shaft 45 during the washing or rinsing cycle and transmits the reduced speed to the washing shaft 45. In the spin-drying cycle, the drum 123 rotates to transmit the rotational force of the clutch rotation shaft 125 to the spin-drying shaft 35 as it is.

Specifically, when the spin-drying shaft 35 is fixed, the clutch 120 reduces the rotation speed of the clutch rotation shaft 125 through the reduction gear to provide the rotation to the washing shaft 45. When the spin-drying shaft 35 rotates together with the washing shaft 45, the clutch 120 provides the rotational force of the clutch rotation shaft 125 to the spin-drying shaft 35 as it is.

The brake belt 126 holds the shaft assembly 250 so as not to rotate according to the operation of the brake lever 127. Specifically, the brake belt 126 holds the drum 123 so that the spin-drying shaft 35 is not rotated during the spin-drying cycle.

The brake lever 127 is connected to the drain motor 73 described above to operate the brake belt 126 in accordance with the operation of the drain motor 73 (see FIG. 2). Specifically, in a state in which the drain motor 73 is not operated, the brake lever 127 tightens the brake belt 126 so that the brake belt 126 holds the spin-drying shaft 35. When the drain motor 73 is operated, the brake lever 127 releases the brake belt 126 so that the spin-drying shaft 35 may rotate.

The pulley unit 130 includes a driving pulley 131 coupled with the motor rotating shaft 115 of the driving motor 110, a driven pulley 133 coupled with the clutch rotation shaft 125 of the clutch 120, and a pulley belt 132 for transmitting the rotational force of the driving pulley 131 to the driven pulley 133.

To briefly explain the transmission process of rotational force, the driving motor 110 generates a rotational force using an AC power supplied from an external power source, and transmits the generated rotational force to the pulley unit 130. The pulley unit 130 transmits the rotational force received from the driving motor 110 to the clutch 120 through the pulley belt 132.

Since the rotational force generated by the driving motor 110 is transmitted to the clutch 120 through the pulley unit 130, the rotational speed of the driving motor 110 and the rotational speed of the clutch 120 may be different from each other.

For example, if the diameter of the driving pulley 131 connected to the driving motor 110 is smaller than the diameter of the driven pulley 133 connected to the clutch unit 120, the rotational force of the driving motor 110 is decelerated by the pulley unit 130 and then transmitted to the clutch 120.

The clutch 120 selectively transmits the rotational force transmitted from the pulley unit 130 to the spin basket 30 and the pulsator 40.

Specifically, during the washing or rinsing cycle, the clutch 120 decelerates the rotational force transmitted from the pulley unit 130 and transmits the rotational force to the pulsator 40. During the spin-drying cycle, the clutch 120 transmits the rotational force to the spin basket 30 and the pulsator 40 as it is transmitted from the pulley unit 130.

The washing machine 1 includes a position indicating member and a sensor for detecting the rotational speed of the spin basket 30.

Figure 6:
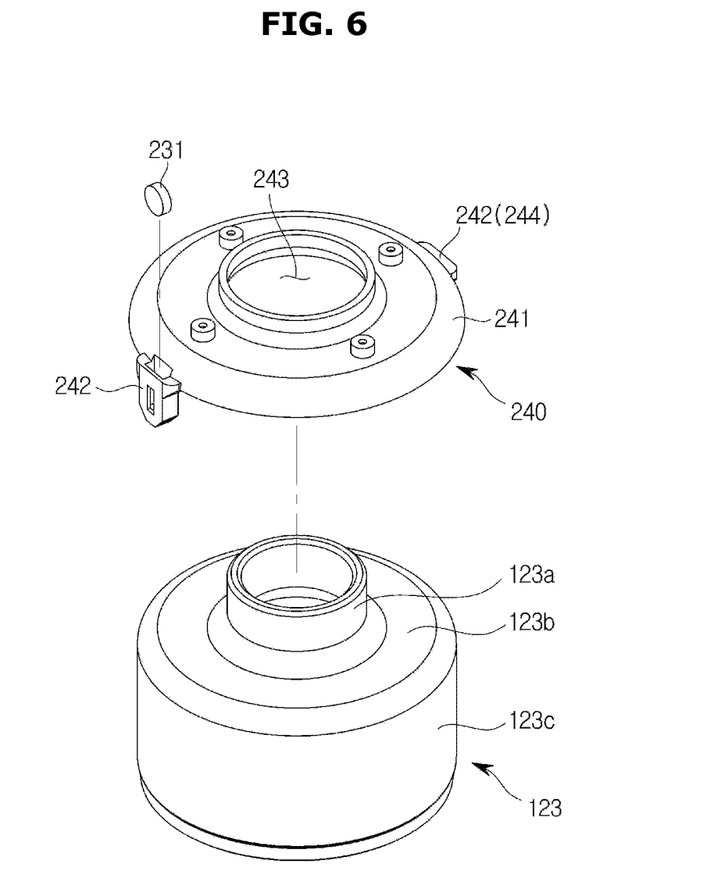
FIG. 6 is a perspective view illustrating a position indicating member and a mounting member of a washing machine according to an embodiment of the present disclosure.
Figure 7:
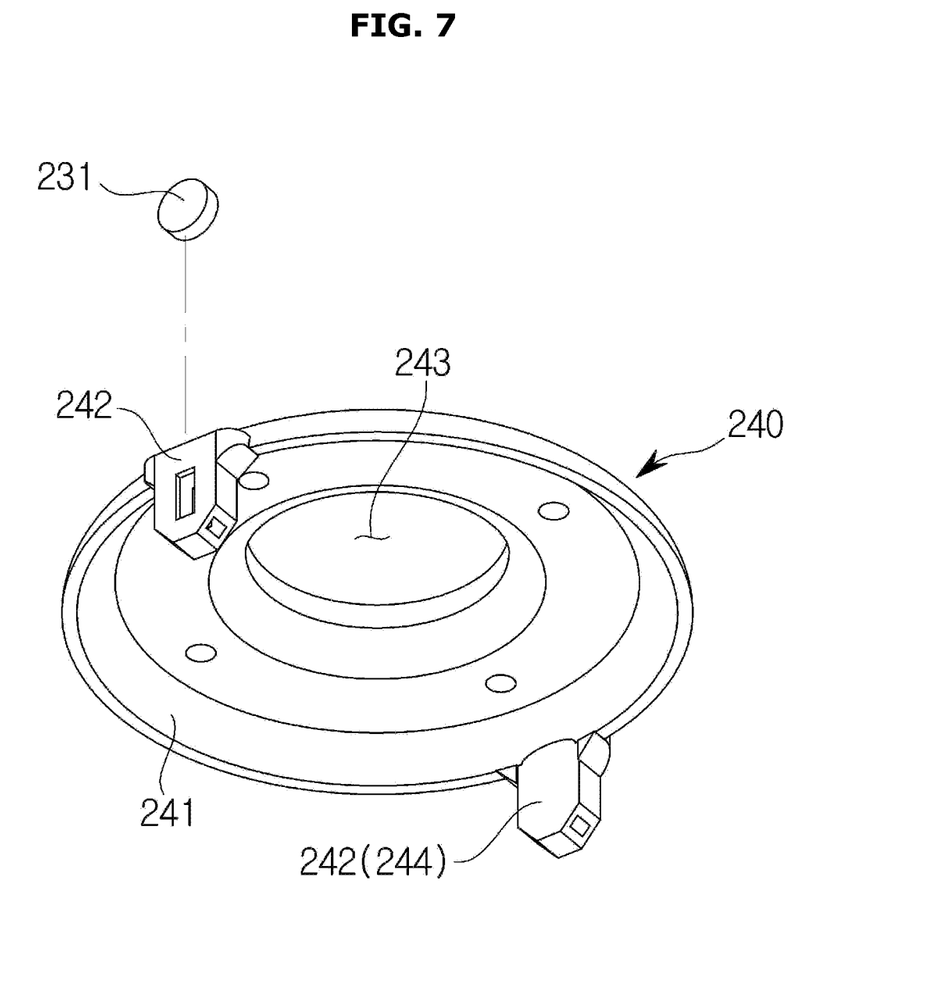
FIG. 7 is another perspective view illustrating the position indicating member and the mounting member illustrated in the FIG. 6.
Figure 8:
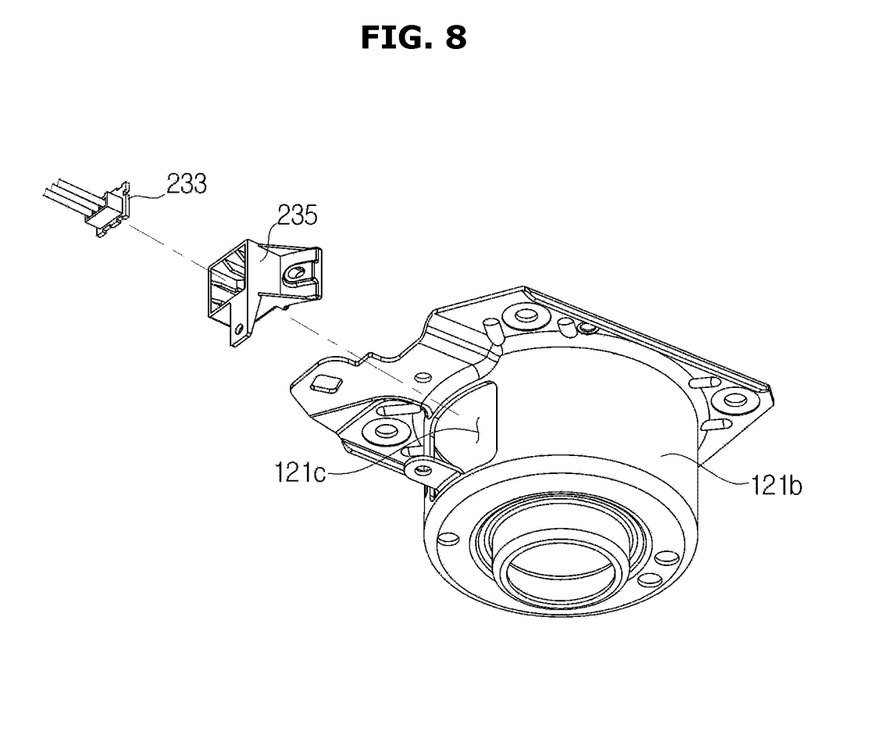
FIG. 8 is an exploded perspective view illustrating a sensor and a mounting member of a washing machine according to an embodiment of the present disclosure.

FIG. 6 is a perspective view illustrating a position indicating member and a mounting member of a washing machine according to an embodiment of the present disclosure, FIG. 7 is another perspective view illustrating the position indicating member and the mounting member illustrated in the FIG. 6, and FIG. 8 is an exploded perspective view illustrating a sensor and a mounting member of a washing machine according to an embodiment of the present disclosure.

The position indicating member 231 may be positioned in a rotating configuration such as the spin-drying shaft 35 and the sensor 233 may be positioned in a fixed configuration such as the clutch housing 121.

Referring to FIGS. 5 to 8, the position indicating member 231 is provided inside the clutch housing 121 so as to rotate together with the shaft assembly 250. Specifically, the position indicating member 231 is provided to rotate together with the spin-drying shaft 35, and is disposed in the side surface of the drum 123 which is connected to the spin-drying shaft 35 and rotates together with the spin-drying shaft 35.

The position indicating member 231 may be directly mounted on the outer side surface of the drum 123 and may be mounted by an additional mounting member 240. The mounting member 240 may include a body 241 supported on the drum 123 and an extension 242 on which the position indicating member 231 is mounted.

Specifically, the drum 123 may include a neck 123a connected to the spin-drying shaft 35. The mounting member 240 may include a hole 243 in the body 241 through which the neck 123a of the drum 123 passes, so as to be supported by an upper surface 123b of the drum 123. The extension 242 is provided extending from the body 241 to a side surface 123c of the drum 123. The mounting member 240 may be fixed to the upper surface 123b of the drum 123 by a fixing member such as a screw.

At least one extension 242 may be provided, and at least one position indicating member 231 may be provided. The position indicating member 231 may be installed in at least one of the plurality of extensions 242. The plurality of extensions 242 may be provided to be spaced along the circumferential direction of the drum 123, and be spaced at equal intervals.

The clutch 120 may include a balancer 244 that rotates together with the position indicating member 231 to align the center of gravity of the position indicating member 231 with the center axis of the shaft assembly 250.

The balancer 244 may be mounted directly on the side surface of the drum 123 like the position indicating member 231 and may be provided on the mounting member 240 on which the position indicating member 231 is provided. That is, the mounting member 240 may include the balancer 244. Among the plurality of extensions 242 of the mounting member 240, the remaining extensions 242 in which the position indicating member 231 is not installed may serve as the balancer 244.

Although not shown in the drawings, the mounting member 240 of the position indicating member 231 may be fixed to various configurations with which the spin-drying shaft 35 rotates together as well as the drum 123.

The sensor 233 is disposed outside the clutch housing 121 and sensing the position indicating member 231 to detect the rotational speed of the spin basket 30. The clutch housing 121 includes an opening 121c for connection of the brake lever 127 and the brake belt 126. The position indicating member 231 is arranged to be exposed to the outside of the clutch housing 121 through the opening 121c in accordance with the rotation of the spin-drying shaft 35.

The sensor 233 senses the position indicating member 231 exposed in the opening 121c of the clutch housing 121 and detects the rotational speed of the spin basket 30. The position indicating member 231 rotates around the center axis of the spin-drying shaft 35 together with the drum 123, and the sensor 233 may periodically sense the position indicating member 231 while the position indicating member 231 is rotating.

The sensor 233 may calculate the rotational speed of the spin-drying shaft 35 using the period in which the position indicating member 231 is sensed and the number of times in which the position indicating member 231 is sensed during a predetermined reference time.

Further, the washing machine 1 may calculate the rotational speed of the spin basket 30 based on the rotational speed of the spin-drying shaft 35 detected by the sensor 233.

In addition, if two or more position indicating members 231 are provided along the circumferential direction of the drum 123 according to an exemplary embodiment, the sensor 233 may detect not only the rotational speed of the spin basket 30 but also the rotational direction of the spin basket 30.

The sensor 233 may be mounted directly on the outer surface of one side of the opening 121c provided in the clutch housing 121, or may be mounted on the clutch housing 121 by an additional mounting member 235.

Specifically, the sensor 233 may be mounted directly on the outer surface of the clutch housing 121 in the vicinity of the opening 121c, or may be mounted over the opening 121c by the mounting member 235 so as to be positioned closer to the position indicating member 231. The mounting member 235 into which the sensor 233 is inserted may be mounted on the outer surface of the clutch housing 121 to be adjacent to the opening 121c by a fixing member such as a screw. The sensor 233 may be fixed to the mounting member 235 by tight-fitting engagement and the like.

The sensor 233 and the position indicating member 231 may adopt various configurations for detecting the rotational displacement or rotational speed of a rotating body in order to detect the rotational speed of the spin-drying shaft 35. For example, the washing machine 1 may employ a hall sensor for detecting a magnetic field as the sensor 233 and may employ a permanent magnet for generating a magnetic field as the position indicating member 231.

Specifically, a permanent magnet may be disposed on the shaft assembly 250, the spin-drying shaft 35, or the drum 123 to rotate together with the spin-drying shaft 35, and a hall sensor may be disposed at the clutch housing 121 to detect the permanent magnet.

During the rotation of the shaft assembly 250, the spin-drying shaft 35, or the drum 123 on which the permanent magnet is disposed, the hall sensor periodically senses the magnetic field generated by the permanent magnet. The washing machine 1 may calculate the rotational speed of the spin basket 30 on the basis of the period in which the hall sensor senses the magnetic field or the number of times the hall sensor senses the magnetic field during a predetermined reference time.

In the foregoing, the construction of the washing machine 1 according to the embodiment of the present disclosure has been described.

Hereinafter, the washing, rinsing and spin-drying cycles will be described.

During the washing cycle, the washing machine 1 separates the foreign substances adhered to the laundry by using the mechanical action between the water and the laundry and the chemical action of the detergent.

For the mechanical action between the water and the laundry, the washing machine 1 supplies water to the water tub 30 and rotates the pulsator 40 clockwise or counterclockwise to generate water flow. For the chemical action of the detergent, the washing machine 1 allows the water to pass through the detergent supplier 60 so to supply the detergent to the spin basket 30.

Specifically, during the washing cycle, the washing machine 1 may perform a water supply operation, a washing operation, a drain operation, and an intermediate spin-drying operation.

The water supply operation is an operation in which the washing machine 1 supplies water to the water tub 20. The washing machine 1 operates the water supply valve 53 of the water supplier 50 for a predetermined water supply time according to the detected amount of laundry.

After the water supply operation is completed, the washing machine 1 performs the washing operation. The washing operation is an operation of rotating the pulsator 40 so that the laundry is washed. The washing machine 1 rotationally drives the pulsator 40.

Specifically, the washing machine 1 operates the clutch 120 so that the rotational force of the driving motor 110 is transmitted only to the pulsator 40. For example, if the washing machine 1 does not operate the drain motor 73 (see FIG. 2), the washing machine 1 may allow that the clutch unit 120 transmits the rotational force of the driving motor 110 only to the pulsator 40 not to the spin basket 30.

When the clutch 120 is operated so that the rotational force of the driving motor 110 is transmitted only to the pulsator 40, the clutch 120 reduces the rotational speed of the rotational force transmitted from the driving motor 110 and transmits the rotational force to the pulsator 40.

The washing machine 1 repeats the washing operation for a predetermined reference washing time according to the amount of laundry. The washing machine 1 may change the rotational direction of the pulsator 40 each time the washing operation is performed.

After the washing operation is completed, the washing machine 1 performs a drain operation.

The drain operation is an operation in which the washing machine 1 discharges the water contained in the water tub 20 to the outside. Specifically, the washing machine 1 may open the drain valve 72 by activating the drain motor 73.

After the drain operation, the washing machine 1 can perform the intermediate spin-drying operation. The intermediate spin-drying operation is an operation of spinning the spin basket 30 and the pulsator 40 at a high speed and separating water from the laundry by using the centrifugal force due to high speed rotation.

The intermediate spin-drying operation will be described below because the intermediate spin-drying operation is the same as the operation of the washing machine 1 in the spin-drying cycle to be described later.

When the washing cycle is completed, the washing machine 1 performs a rinsing cycle. During the rinsing process, the washing machine 1 removes foreign substances and detergent from the laundry. Specifically, during the rinsing process, the washing machine 1 may perform a water supply operation, a rinsing operation, a drain operation, and an intermediate spin-drying operation.

During the rinsing process, the washing machine 1 supplies water to the water tub 20 to perform the water supply operation, rotates the pulsator 40 clockwise or counterclockwise to perform the rinsing operation, and rotates the spin basket 30 and the pulsator 40 at a high speed after discharging the water from the drum 20 to the outside so to perform the intermediate spin-drying operation.

The water supply operation, the rinsing operation, the drain operation, and the intermediate spin-drying operation of the rinsing process are the same as the water supply operation, the washing operation, the drain operation and the intermediate spin-drying operation of the washing process. Therefore, a detailed description of the water supply operation, the rinsing operation, the drain operation, and the intermediate spin-drying operation of the rinsing process is omitted.

When the rinsing process is completed, the washing machine 1 performs a spin-drying process.

During the spin-drying process, the washing machine 1 rotates the spin basket 30 and pulsator 40 at a high speed, and separates water from laundry by centrifugal force due to high-speed rotation. Specifically, during the spin-drying process, the washing machine 1 performs an intermittent spin-drying operation in which the spin basket 30 and the pulsator 40 are rotated at a relatively low speed and a main spin-drying operation in which the spin basket 30 and the pulsator 40 are rotated at a high speed of 700 rpm or more.

During the intermittent spin-drying operation, the washing machine 1 repeats the activating and stopping of the driving motor 110, and during the main spin-drying operation, the washing machine 1 activates the driving motor 110 for a predetermined time.

The washing machine 1 may reduce the load to the driving motor 110 in the main spin-drying operation by performing the intermittent spin-drying operation. Because A large amount of water is separated from the laundry during the intermittent spin-drying operation, the weight of the laundry during the main spin-drying operation is significantly lower than the laundry weight during the intermittent spin-drying operation.

The washing machine 1 may drain the water separated from laundry by performing the intermittent spin-drying operation.

While the spin basket 30 is rotating at a high speed, the water in the water tub 20 is not drained smoothly. This is because the water is continuously supplied between the spin basket 30 and the water tub 20 by the centrifugal force generated by the rotation of the spin basket 30.

The washing machine 1 drains a large amount of water separated from laundry by spinning the spin basket 30 at a low speed before rotating the spin basket 30 at a high speed, thereby the spin-drying efficiency of the washing machine 1 is increased.

At least one resonance region exists in the rotational speed range at which the washing machine 1 performs an intermittent spin-drying operation.

The resonance is a phenomenon in which the vibration of the spin basket 30 becomes very large when the vibration frequency of the spin basket 30 included in the washing machine 1 coincides with the frequency of the rotation supplied by the driving motor 110 of the washing machine 1.

When the resonance phenomenon occurs, the vibration and the noise caused by the vibration of the washing machine 1 become very large, and in severe case the washing machine may be damaged.

The resonance due to the rotation of the spin basket 30 may roughly be divided into two types. Although there is a difference depending on the size of the spin basket 30, there are a first resonance which occurs when the spin basket 30 rotates at a speed of about 100 rpm and a second resonance which occurs when the spin basket 30 rotates at a speed of about 300 rpm.

The first resonance is that the entire spin basket 30 vibrates to the left and right while the spin basket 30 rotates and the second resonance is that the upper part of the spin basket 30 and the lower part of the spin basket are vibrated in directions opposite to each other while the spin basket 30 rotates.

The rotational speed of the spin basket 30 in which the first resonance and the second resonance occurs may vary depending on the size, shape, and weight of the spin basket 30, and particularly, the amount of laundry and the location of laundry contained in the spin basket 30.

For these reasons, the first resonance and the second resonance occur not only at a specific rotational speed but also in a continuous rotational speed range.

In order to perform the intermittent spin-drying operation, the conventional washing machine stops the driving motor for a predetermined OFF time after activating the driving motor for a predetermined ON time.

By the intermittent spin-drying operation, the rotational speed of the spin basket 30 is increased when the driving motor is operated and the rotational speed is decreased when the driving motor is stopped.

If the rotational speed region where the first resonance occurs is referred to as a first resonance region and the region of the rotational speed where the second resonance occurs is referred to as a second resonance region, the ON time and the OFF time of the driving motor are appropriately set so that the rotational speed of the spin basket 30 passes through the first resonance region and the second resonance region once.

However, when the amount of laundry is increased or the power supply for supplying electric energy to the driving motor is unstable, the rotational speed of the spin basket 30 passes through the first resonance region and the second resonance region several times, respectively. As a result, the vibration of the spin basket during intermittent spin-drying operation may become very large.

Thus, the conventional washing machine has difficulties in avoiding the resonance area by controlling the operation of the driving motor based on the operation time in the intermittent spin-drying operation.

The washing machine 1 according to the embodiment of the present disclosure easily avoids the resonance area by controlling the operation of the driving motor 110 based on the rotation speed of the spin basket 30. The intermittent spin-drying operation of the washing machine 1 according to the embodiment of the present disclosure will be described.

First, the washing machine 1 rotationally drives the spin basket 30 and pulsator 40.

The washing machine 1 operates the clutch 120 so that the rotational force of the driving motor 110 is transmitted to both the spin basket 30 and the pulsator 40. For example, when the washing machine 1 operates the drain motor 73 (see FIG. 2), the washing machine 1 may allow that the clutch 120 transmits the rotational force of the driving motor 110 to both the spin basket 30 and the pulsator 40.

When the clutch 120 is operated so that the rotational force of the driving motor 110 is transmitted to both the spin basket 30 and the pulsator 40, the clutch 120 transfers the rotational force received from the driving motor 110 to both the spin basket 30 and the pulsator 40 as it is.

The washing machine 1 operates the driving motor 110 intermittently. As a result, the rotational speed of the driving motor 110 or the spin-drying shaft 35 gradually increases. The increase in the rotational speed of the driving motor 110 or the spin-drying shaft 35 may vary depending on the amount of laundry and water contained in the spin basket 30.

In the spin-drying process, the washing machine 1 may control the driving motor 110 so that the driving motor 110 rotates in either the clockwise or counterclockwise direction, unlike in the washing process. As a result, the spin basket 30 and pulsator 40 rotate in either the clockwise or counterclockwise direction during the spin-drying process.

Thereafter, the washing machine 1 detects the rotational speed of the spin basket 30, and determines whether the detected rotational speed is equal to or greater than a predetermined reference speed.

Specifically, the washing machine 1 may detect the rotational speed of the spin-drying shaft 35 or the drum 123 via the sensor 233 and may compare the detected rotational speed of the spin-drying shaft 35 or the drum 123 with the reference speed.

When the detected rotational speed is not equal to or greater than the reference speed, the washing machine 1 detect the rotational speed of spin-drying shaft 35 or the drum 123 while maintaining the rotation of the spin basket 30 and the pulsator 40 and repeatedly compare the detected rotational speed with the reference speed.

If the detected rotation speed is equal to or higher than the reference speed, the washing machine 1 determines whether the number of times of intermittent spin-drying is equal to or more than the reference number of times of intermittent spin-drying. If the number of times of intermittent spin-drying is not equal to or more than the reference number of times intermittent spin-drying number, the washing machine 1 repeats the intermittent spin-drying operation. If the number of times of intermittent spin-drying is equal to or more than the reference number of times intermittent spin-drying number, the washing machine 1 ends the intermittent spin-drying operation and starts the main spin-drying operation.

When the intermittent spin-drying operation and the main spin-drying operation are completed, the washing machine 1 ends its operation.

During the intermittent spin-drying operation, the washing machine 1 controls the driving motor 110 based on the rotational speed of the spin-drying shaft 35 or the drum 123, thereby the washing machine 1 may minimize the vibration and noise irrespective of the amount of the laundry accommodated in the spin basket 30.

The washing machine including a non-control type motor according to the present disclosure detects the rotation speed of the spin basket and controls on/off of the motor in accordance with the detected rotation speed, thereby minimizing the resonance phenomenon in the spin-drying cycle. If the resonance phenomenon is minimized, excessive vibration of the spin basket and vibration of the washing machine can be prevented, noise can be reduced, and the capacity of the spin basket can be increased.

In addition, in the washing machine according to the present disclosure, the installation structure of the sensor and the position indicating member for detecting the rotational speed of the spin basket is improved, the rotational speed of the spin basket can be accurately detected, and the manufacturing cost of the washing machine can be reduced.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A washing machine comprising:
   a spin-drying shaft connected to a spin basket;
   a clutch configured to transmit rotational force to the spin-drying shaft;
   a position indicating member, disposed inside a clutch housing, configured to move in a circumferential direction about the spin-drying shaft together with a rotation of the spin-drying shaft; and
   a sensor disposed outside the clutch housing and configured to detect a position of the position indicating member as the position indicating member moves in the circumferential direction about the spin-drying shaft,
   wherein:
      the clutch includes a drum accommodated in the clutch housing and connected to the spin-drying shaft to rotate together with the spin-drying shaft,
      the position indicating member is mounted on a mounting member, the mounting member supported on an end of the drum and facing the spin basket and moves in the circumferential direction about the spin-drying shaft with the rotation of the spin-drying shaft, and
      the sensor detects the position indicating member according to a circumferential position of the position indicating member.

2. The washing machine of claim 1, wherein the clutch housing includes an opening to expose the position indicating member to the outside of the clutch housing in accordance with the rotation of the spin-drying shaft, and
   the sensor detects the position indicating member exposed through the opening.

3. The washing machine of claim 1, wherein the sensor is mounted to the outside of the clutch housing.

4. The washing machine of claim 1, further comprising a balancer rotating together with the position indicating member to align a center of gravity of the position indicating member with a center axis of the spin-drying shaft.

5. The washing machine of claim 2, wherein the opening is provided in a side surface of the clutch housing, and
   the sensor is mounted on an outer surface of the clutch housing.

6. The washing machine of claim 1, wherein the position indicating member is mounted on an outer surface of the drum by the mounting member.

7. The washing machine of claim 6, wherein the mounting member includes a balancer to align a center of gravity of the position indicating member with a rotation axis of the spin-drying shaft.

8. The washing machine of claim 6, wherein the drum includes a neck connected to the spin-drying shaft, and
   the mounting member includes a body supported on an upper surface of the drum and a plurality of extensions extended from the body to the side surface of the drum, wherein the body provided with a hole through which the neck of the drum passes.

9. The washing machine of claim 8, wherein the plurality of extensions are spaced apart from each other along a circumferential direction of the drum,
   the position indicating member is installed in at least one of the plurality of extensions, and
   the rest of the plurality of extensions not provided with the position indicating member configured to balance with the position indicating member.

10. The washing machine of claim 2, further comprising:
    a brake belt configured to stop rotation of the spin-drying shaft inside the clutch housing; and
    a brake lever disposed outside the clutch housing to control the brake belt,
    wherein the brake belt is connected to the brake lever through the opening.

11. The washing machine of claim 1, wherein the position indicating member includes a magnet, and
    the sensor includes a hall sensor.

* * * * *